(12) United States Patent
Basudan

(10) Patent No.: US 10,864,060 B1
(45) Date of Patent: Dec. 15, 2020

(54) ROOT CANAL FILLING MATERIAL MARKER

(71) Applicant: KING SAUD UNIVERSITY, Riyadh (SA)

(72) Inventor: Sumaya Omar Basudan, Riyadh (SA)

(73) Assignee: KING SAUD UNIVERSITY, Riyadh (SA)

(*) Notice: Subject to any disclaimer, the term of this patent is extended or adjusted under 35 U.S.C. 154(b) by 0 days.

(21) Appl. No.: 16/894,739

(22) Filed: Jun. 5, 2020

(51) Int. Cl.
*A61C 5/50* (2017.01)
*A61C 19/04* (2006.01)

(52) U.S. Cl.
CPC .............. *A61C 5/50* (2017.02); *A61C 19/041* (2013.01)

(58) Field of Classification Search
CPC ................................ A61C 5/50; A61C 19/041
USPC ............................................................ 433/75
See application file for complete search history.

(56) References Cited

U.S. PATENT DOCUMENTS

| | | | | |
|---|---|---|---|---|
| 3,358,826 A * | 12/1967 | Siegel | A61C 5/44 | 206/368 |
| 3,855,705 A * | 12/1974 | Malmin | A61C 5/44 | 433/32 |
| 3,964,170 A * | 6/1976 | Zdarsky | A61C 19/04 | 33/513 |
| 4,028,810 A * | 6/1977 | Vice | A61C 5/44 | 433/75 |
| 4,182,040 A * | 1/1980 | Bechtold, Jr. | A61C 3/06 | 433/75 |
| 4,212,639 A * | 7/1980 | Schaffner | A61C 5/44 | 433/102 |
| 4,255,142 A * | 3/1981 | Aoyagi | A61C 19/00 | 269/9 |
| 4,293,074 A * | 10/1981 | Dunsky | A61C 5/40 | 206/369 |
| 4,505,675 A * | 3/1985 | Albert | A61C 5/50 | 433/72 |
| 6,358,049 B1 * | 3/2002 | Cerniway | A61C 5/44 | 33/513 |
| 7,232,309 B2 * | 6/2007 | Tse | A61C 19/00 | 433/49 |
| 10,485,633 B2 * | 11/2019 | Li | A61C 5/50 | |
| 2020/0129269 A1 * | 4/2020 | Li | A61C 5/50 | |

FOREIGN PATENT DOCUMENTS

CN 203564365 U 4/2014

OTHER PUBLICATIONS

"Gutta Percha Measurement Cutter"; printed on Mar. 17, 2020 from https://www.dentalkart.com/gutta-percha-measurement-cutter.html.

* cited by examiner

Primary Examiner — Matthew M Nelson
(74) Attorney, Agent, or Firm — Nath, Goldberg & Meyer; Richard C. Litman

(57) ABSTRACT

The root canal filling material marker is a tool for marking a desired length on root canal filling material, such as a conventional gutta percha point. In use, the gutta percha point is inserted into a hollow housing through an aperture formed in a front wall thereof. The gutta percha point is releasably gripped between spring-biased clamp jaws. A shaft is longitudinally positioned to a desired marking point at a desired length of the gutta percha point and then laterally pulled. Laterally pulling the shaft slides an applicator, which is secured to the shaft within the housing, across a marking agent and the gutta percha point to make a laterally extending mark on the gutta percha point at the desired length.

11 Claims, 2 Drawing Sheets

ROOT CANAL FILLING MATERIAL MARKER

BACKGROUND

1. Field

The disclosure of the present patent application relates to dental tools, and particularly to a tool for marking a desired length of root canal filling material, such as a gutta percha point.

2. Description of the Related Art

Root canal treatment is a common dental procedure for cleaning root canals and eliminating root canal contents and microbes, followed by sealing of the root canals with root canal fillings. The root canal treatment begins by opening a cavity within the tooth to reach the pulp and remove it, in order to identify all the root canals in the tooth. Each canal is measured to the end of the root, cleaned, disinfected, and shaped to a specific size and to the measured length. The canals are then sealed by using gutta percha points, which reach the different required lengths of each canal. Gutta percha points are formed from plastic, and are partially formed of soft material. Given their soft nature, and their relatively small sizes, they are difficult to accurately mark at the required length.

In conventional practice, gutta percha points are labelled by making an indentation thereon using a rigid instrument, such as forceps, or through manual bending. Neither of these techniques provides an accurate measurement and depends on the dentist's manual dexterity and precision. Thus, a root canal filling material marker solving the aforementioned problems is desired.

SUMMARY

The root canal filling material marker is a tool for marking a desired length of root canal filling material, such as a conventional gutta percha point. The root canal filling material marker includes a hollow box-shaped housing defined by a top wall, a bottom wall, front and back walls, and first and second side walls. An aperture is formed through the front wall for inserting a gutta percha point formed of root canal filling material. A longitudinally extending slot is formed through one of the side walls, and an opening is also formed through the side wall. A first shaft extends through the opening formed through the first longitudinally extending wall such that a first end thereof is positioned outside the hollow housing and a second end thereof is positioned inside the hollow housing. The first shaft is laterally slidable within the opening. A second shaft extends through the longitudinally extending slot formed through the first longitudinally extending wall, such that a first end thereof is positioned outside the hollow housing and a second end thereof is positioned inside the hollow housing. The second shaft is both longitudinally and laterally slidable within the longitudinally extending slot.

First and second longitudinally extending opposing clamp jaws are disposed within the hollow housing. The first clamp jaw is fixed and the second opposing clamp jaw is spring-biased to bear against the fixed jaw. The second end of the first shaft is attached to the spring-biased jaw so that the first shaft may be pulled to separate the jaws to insert a gutta percha point between the jaws, where the point is clamped when the first shaft is released.

A marking agent, such as graphite, wax, an ink pad or the like, is disposed in a well in the housing beside the fixed jaw, and a marker brush head or applicator is mounted on the second end of the second shaft. The second shaft has an indicator attached thereto, the indicator having a pointer arrow slidable along the top wall of the housing to point at a graduated scale marked on the top wall of the housing when the second shaft is slid along the longitudinally extending slot in the side wall of the housing. In use, the gutta percha point is inserted into the hollow housing through the aperture formed through the first laterally extending wall, and is releasably clamped between the jaws. The second shaft is then longitudinally positioned to a desired marking point at the desired length of the gutta percha point and then laterally pulled to apply the marking agent to the applicator, then drawn back across the gutta percha point to mark the desired length on the gutta percha point.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
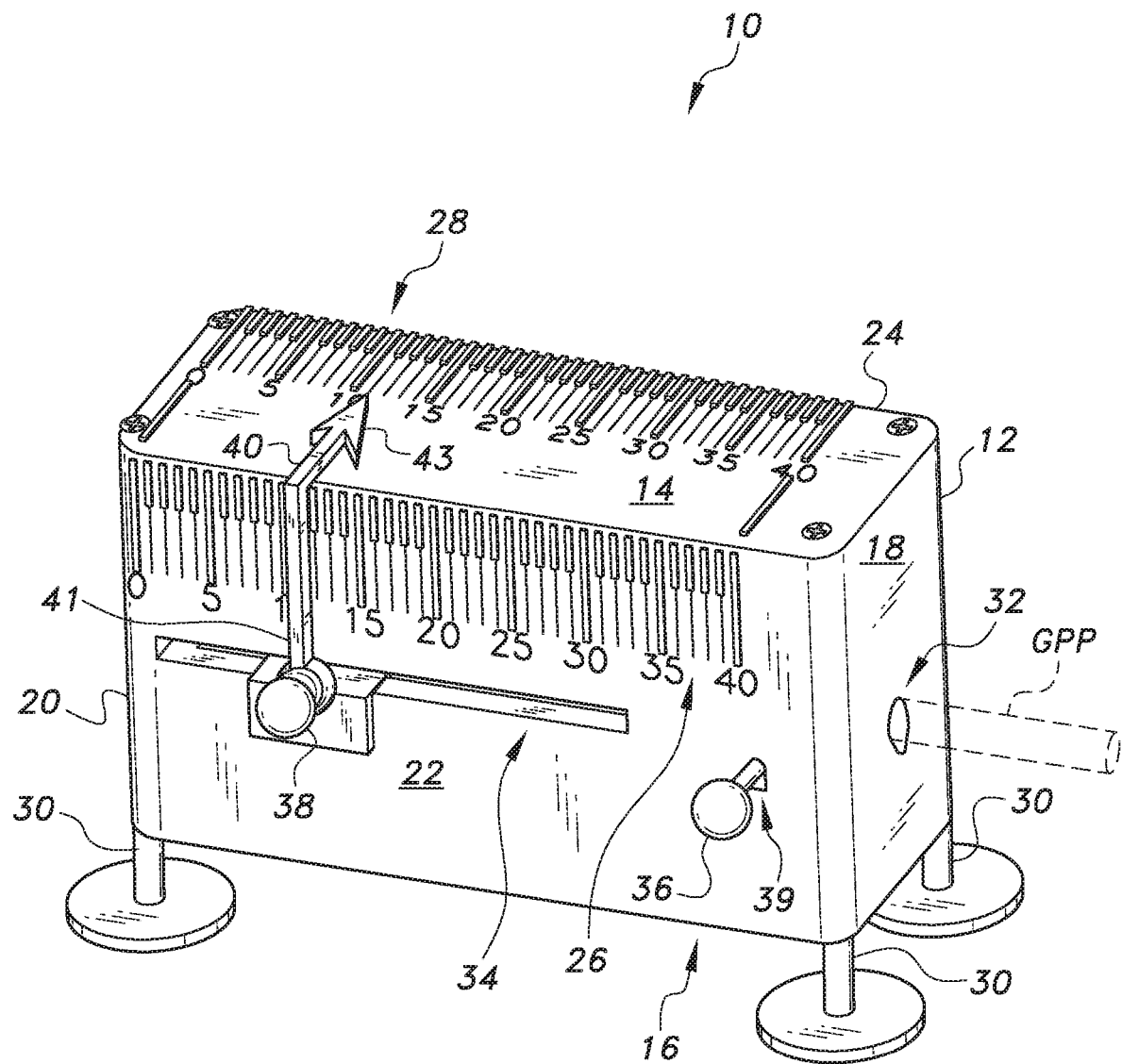
FIG. 1 is a perspective view of a root canal filling material marker.
Figure 2:
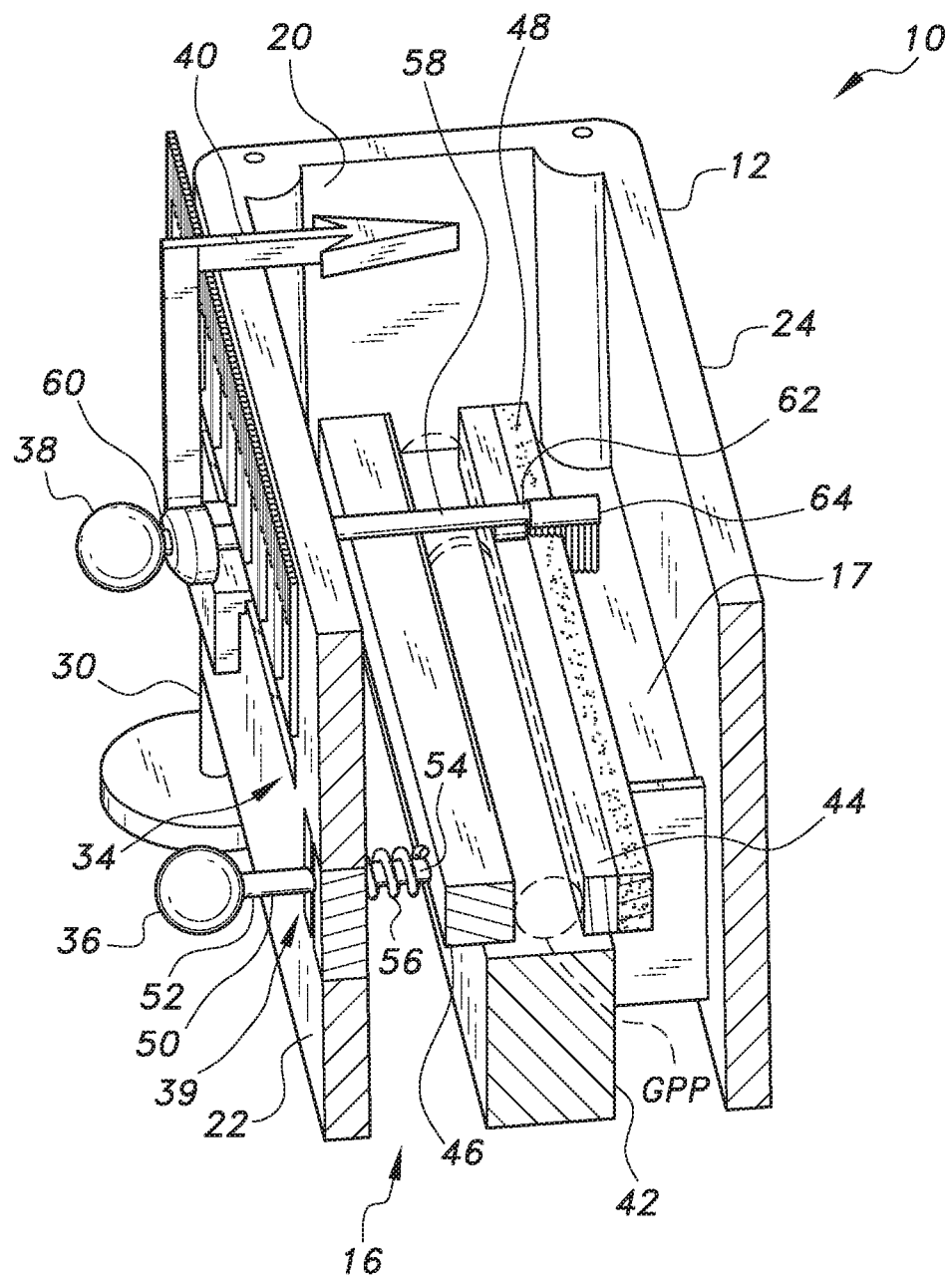
FIG. 2 is a perspective view of the root canal filling material marker, shown with the top wall and the bottom wall removed and the side walls broken away to show the interior thereof.

The root canal filling material marker 10 is a tool for marking a desired length of root canal filling material, such as a conventional gutta percha point GPP. As shown in FIGS. 1 and 2, the root canal filling material marker 10 includes a hollow, box-shaped housing 12 having top wall 14, a bottom wall 16, a front wall 18, a back wall 20, and opposing side walls 22, 24, respectively. As shown in FIG. 2, bottom wall 16 may be removed so that the bottom of the housing 12 is open. An aperture 32 is formed in the front wall 18 for insertion of at least a portion of a gutta percha point GPP, or the like, formed of root canal filling material. As shown, a plurality of legs 30 may be mounted on the bottom of the housing 12. It should be understood that the overall dimensions and configuration of the housing 12 and the legs 30 are shown for exemplary purposes only. It should be further understood that the gutta percha point GPP is shown for exemplary and illustrative purposes only. Additionally, it should be understood that the top wall 14 may be removable, allowing for cleaning and maintenance of the root canal filling material marker 10. In FIG. 2, the top wall 14 is shown removed for purposes of illustration.

An elongated slot 34 is defined in the side wall 22, and an opening 39 is also defined in the side wall 22 adjacent the front wall 18. As shown in FIG. 2, a first shaft 50 extends through the opening 39 such that a first end 52 of the first shaft 50 is positioned outside the housing 12, and a second end 54 of first shaft 50 is positioned inside the housing 12. A second shaft 58 extends through the slot 34 defined in the side wall 22 so that a first end 60 of the second shaft 58 is positioned outside the housing 12 and a second end 62 of the second shaft 58 is positioned inside the housing 12. The second shaft 58 is both longitudinally and laterally slidable within the slot 34. As shown, a first knob 36 for gripping by the user may be mounted on the first end 52 of the first shaft 50. Similarly, a second knob 38 for gripping by the user may be mounted on the first end 60 of the second shaft 58. It should be understood that the decorative appearance and relative dimensions of the first and second knobs 36, 38 are shown for exemplary purposes only.

First and second elongated opposing clamp jaws 44, 46, respectively, are disposed within the housing 12. Each of the clamp jaws 44, 46 is preferably formed of or lined with a relatively soft material, such as foam or the like. The clamp jaw 44 is fixed in the housing 12, and the clamp jaw 46 is spring-biased against the fixed clamp jaw 44. The user grips the knob 36 and pulls the shaft 50 partially out of the housing 12 to overcome the bias applied by a helical spring 56 concentrically disposed over the shaft 50 between the wall 22 and the clamp jaw 46 to separate the jaws 44, 46 enough to insert a gutta percha point GPP between the jaws 44, 46 and clamp the gutta percha point GPP therebetween. The faces of the jaws 44, 46 may have cylindrical recesses defined therein for cushioning the gutta percha point GPP to avoid flattening thereof.

The second end 54 of the first shaft 50 is attached to the movable clamp jaw 46 such that lateral movement of the first shaft 50 separate the jaws 44, 46 enough to insert a gutta percha point GPP between the jaws 44, 46. Thus, the user can pull first knob 36 to insert the gutta percha point GPP through the opening 32. As further shown in FIG. 2, a longitudinally extending platform 42 is mounted on the bottom wall 16 of the hollow housing 12 for releasably supporting the gutta percha point GPP. A platform 42 may be secured to an internal mount 17, which is fixed to the internal face of the side wall 24. The fixed clap jaw 44 may be mounted on the platform 42.

A marking agent 48, such as graphite, wax, an ink pad or the like, is disposed in a well or on a support between the fixed jaw 44 and the side wall 24, and an applicator 64, such as a brush head or the like, is mounted on the second end 62 of the second shaft 58. As shown in FIG. 1, first and second sets of graduated measurement indicia 26, 28, respectively, are formed on the side wall 22 and the top wall 14 corresponding to the length of the gutta percha point GPP inserted into the marker 10. An indicator needle 40 may be mounted on the first end 60 of the second shaft 58, allowing the user to easily see where the second shaft 58 is positioned with respect to the graduated measurement indicia 26, 28. The indicator needle 40 may be L-shaped, having a first portion 41, which extends vertically, and a second portion 43, which extends laterally, allowing the user to make use of either or both of the first and second sets of graduated measurement indicia 26, 28. It should be understood that the arrow-shaped indicator needle 40 is shown for exemplary purposes only.

In use, the knob 36 is pulled to retract the movable clamp jaw 46 and the gutta percha point GPP is inserted into the housing 12 through the aperture 32 formed in the front wall 18, and it is releasably gripped between the clamp jaws 44, 46. The second shaft 58 is then longitudinally positioned to a desired marking point at the desired length of the gutta percha point GPP, using the indicator needle 40 and the first and second sets of graduated measurement indicia 26, 28, and then laterally pulled. Laterally pulling the second shaft 58 slides the applicator 64 laterally across the marking agent 48 and the gutta percha point GPP to make a laterally extending mark on the gutta percha point GPP at the desired length. The user can then pull the first knob 36 to release the gutta percha point GPP from the clamp jaws 44, 46 and remove the gutta percha point GPP from the housing 12.

It is to be understood that the root canal filling material marker is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A root canal filling material marker, comprising:
   a box-shaped housing having a top wall, a bottom, front wall, a back wall, and opposing first and second side walls extending between the front and back walls, the front wall having an aperture defined therein adapted for removable insertion of a gutta percha point formed of root canal filling material into the housing, one of the side walls having a longitudinally extending slot and a clamp release opening defined therein;
   a first shaft having opposed first and second ends, the first shaft extending through the clamp release opening in the side wall so that the first end of the shaft is positioned outside the housing and the second end of the shaft extends inside the housing;
   a second shaft having opposed first and second ends, the second shaft extending through the longitudinally extending slot in the side wall so that the first end of the second shaft is positioned outside the housing and the second end of the second shaft extends inside the housing, the second shaft being slidable in the slot;
   a movable clamp jaw disposed in the housing adjacent the side wall having the slot and the clamp release opening defined therein and a fixed clamp jaw disposed in the housing adjacent the opposing side wall, the second end of the first shaft being attached to the movable clamp jaw, the first shaft having a helical bias spring disposed concentrically about the shaft between the side wall and the movable jaw, the spring biasing the clamp jaws together, the clamp jaws being elongated and adapted for releasably holding the gutta percha point therebetween;
   a marking agent disposed between the fixed clamp jaw and the opposing side wall; and
   an applicator mounted on the second end of the second shaft;
   indicia disposed on at least one of the walls of the housing defining a graduated scale extending parallel to the slot corresponding to a length of the gutta percha point inserted in the housing; and
   an indicator mounted on the first end of the second shaft;
   whereby the first shaft may be retracted to insert the gutta percha point between the clamp jaws and released to support the gutta percha point between the jaws, the second shaft may be slid along the slot to align the indicator with the graduated indicia at a desired length of the gutta percha point, and the second shaft may draw the applicator across the marking agent and the gutta percha point to mark the gutta percha point at a desired length of root canal filler material.

2. The root canal filling material marker as recited in claim 1, further comprising gripping members mounted on the first ends of the first and second shafts.

3. The root canal filling material marker as recited in claim 2, wherein the gripping members comprise first and second knobs, respectively.

4. The root canal filling material marker as recited in claim 3, wherein the clamp jaws are each lined with soft padding and have cylindrical recesses defined therein to cushion the gutta percha point.

5. The root canal filling material marker as recited in claim 1, wherein the bottom of the housing is open.

6. The root canal filling material marker as recited in claim 1, wherein said indicia are disposed on one of the side walls adjacent the slot defined therein.

7. The root canal filling material marker as recited in claim 1, wherein the indicia are disposed on the top wall of the housing.

8. The root canal filling material marker as recited in claim 7, wherein said indicator comprises an L-shaped arm having an arm extending partially across the top wall of the housing, the L-shaped arm having an end having a pointer arrow mounted thereon.

9. The root canal filling material marker as recited in claim 1, further comprising a plurality of legs secured to the bottom of the housing.

10. The root canal filling material marker according to claim 1, wherein said marking agent is selected from the group consisting of graphite, wax, and ink.

11. The root canal filling material marker according to claim 1, wherein said applicator comprises a brush.

* * * * *